Patented Aug. 14, 1945

2,381,886

UNITED STATES PATENT OFFICE 2,381,886

ESTERS

Martin E. Cupery, Wilmington, Del., assignor to E. I. du Pont de Nemours & Company, Wilmington, Del., a corporation of Delaware No Drawing. Application April 30, 1942,
Serial No. 441,223

7 Claims. (Cl. 260—410.7)

This invention relates to new synthetic drying oils and to coating compositions containing them.

The higher grade natural drying oils, such as China-wood, perilla, and oiticica oils, are for the most part imported and are subject to wide fluctuation in price, quality, and availability. Some of these oils have a tendency to form films which "crystallize" or "frost." Previous attempts to provide synthetic substitutes having the desirable film-forming characteristics of these natural oils have been for the most part unsatisfactory in one or more ways.

This invention accordingly has as its general objective the preparation of new esters which can be substituted for the rapidly drying natural fatty oils in coating compositions into which fatty oils are ordinarily formulated.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acids which will give esters having such properties.

A still further objective is the preparation of esters from those monocarboxylic acids which have the particular types of unsaturation, and other elements of chemical structure, which will impart rapid drying film properties to said esters.

An additional objective is the provision of methods of making these new esters.

Another objective is the preparation of new and improved coating compositions containing these new esters.

The above and other objects appearing hereinafter are accomplished by preparing, for example, by one of the methods subsequently described in detail, a polyhydric alcohol ester of a monofunctional acylacrylic acid. These esters may be simple esters (i. e., all the hydroxyls of the polyhydric alcohol being esterified with one and the same acylacrylic acid) or they may be mixed esters, in which the hydroxyls of the polyhydric alcohol are esterified with different acylacrylic acids or with an acylacrylic acid and one or more other monofunctional monocarboxylic acids of different structure. The latter acids are preferably unsaturated, the acids of natural drying or semidrying oils being most useful. The mixed esters can also be designated as polyhydric alcohol mixed esters, the acyl radicals of which comprise those of the acylacrylic acid and a monofunctional monocarboxylic acid of different structure.

The expression "acylacrylic acid" is used in a generic sense to designate any of those keto-monocarboxylic acids having an ethylenic double bond between the α and β carbon atoms and an acyl group attached to either the α or β carbon. The novel properties of the products of the invention are considered to depend from this particular and peculiar arrangement of carboxyl group, ethylenic double bond, and ketone group. The remainder of the molecule is substantially immaterial provided the acid is "monofunctional," i. e., contains no groups, such as hydroxyl, primary amino, secondary amino, sulfhydryl, and the like, which are known to react with the carboxyl group under normal esterification conditions.

The simple esters referred to above can be prepared by reacting the polyhydric alcohol with the acylacrylic acid or appropriate esterifiable derivative thereof, such as an acid halide or an ester with a lower aliphatic monohydric alcohol. The mixed esters can be prepared in general by reacting the polyhydric alcohol, simultaneously or successively, in either order, with the several monocarboxylic acids or their esterifiable derivatives, such acids including at least one acylacrylic acid and, usually, at least one monofunctional monocarboxylic acid of different structure. It is to be noted, however, that the α-acylacrylic acids are in general relatively unstable as free acids, and their polyhydric alcohol esters, simple or mixed, are best prepared by ester interchange from an ester of the α-acylacrylic acid with a volatile monohydric alcohol.

In one of the preferred methods of carrying out the invention, the acylacrylic acid, or ester thereof with a volatile alcohol, is reacted with a polyhydric alcohol which has been partially esterified with a different monofunctional monocarboxylic acid or acids. When these polyhydric alcohol partial esters are glycerol partial esters of a long chain fatty acid, they are most suitably obtained by heating fatty oils in the usual way with glycerol and, preferably, an ester interchange catalyst. In carrying out this alcoholysis step, the oil and free polyhydric alcohol, in proportions calculated to give the degree of alcoholysis desired, are placed, along with a small amount of alcoholysis catalyst (e. g., 0.01 to 0.1% litharge based on the oil), in a reactor fitted with an agitator, a device to measure the temperature, and a gas inlet. The mixture is then heated with stirring for 1 to 2 hours at about 200–250° C., an oxygen-free inert gas such as carbon dioxide or nitrogen being passed into and over the mixture. In the esterification step, this polyhydric alcohol partial ester is usually cooled to about 140–150° C., and the acylacrylic acid, or esterifiable derivative, is introduced in approximately the amount sufficient to esterify the free hydroxyl groups calculated to be present from the initial proportions of oil and polyhydric alcohol. A hydrocarbon solvent, such as xylene or toluene, is next added in an amount sufficient to produce boiling when the temperature reaches about 200° C. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. Depending on the temperature of reaction, which in turn is governed by the nature and amount of solvent employed, the reaction is usually completed within 4–16 hours; thus, when the temperature is around 200° C., the process is usually completed within 4–10 hours. The reaction can be accelerated if desired by means of esterification catalysts, such as sodium bisulfate. The progress of the reaction can be followed by acid number determinations, the heating being stopped when the acid number reaches or approachs constancy, or at any desired value. There is obtained a viscous solution of the new drying oil from which the solvent can be removed, if desired, by distillation or by forcing a rapid stream of carbon dioxide through the mixture. This oil can be formulated, by conventional methods used with natural drying oils, into valuable coating compositions. For such purposes, it can be used alone, or in blends with natural or synthetic resins and/or natural drying or semi-drying oils. Hot blending of these new oils with the natural drying or semi-drying oils gives coating composition vehicles of unique properties.

Another good method of preparing the polyhydric alcohol mixed esters of this invention is to heat together a polyhydric alcohol, a polyhydric alcohol ester such as a drying or semi-drying oil, and sufficient acylacrylic acid or esterifiable derivative to react with the free hydroxyl groups present in this mixture.

In preparing the esters of the present invention, certain precautions are often necessary in order to obtain satisfactory results from a number of stand points. The esterification reaction for the preparation of the drying oil is preferably carried out at as low a temperature as is practical. Another such precaution is the maintenance of an inert atmosphere by the use of an oxygen-free inert gas. By complete or essentially complete exclusion of oxygen, superior color is obtained, while, if the reaction is carried out at high temperature in the presence of oxygen, poorer color, combined with decomposition and sometimes inferior drying, is encountered. To obtain light-colored products, it is also necessary to avoid use of materials which liberate oxygen under reaction conditions. Thus, solvents employed should not be those which contain or give off free oxygen or similar active products during the reaction. For example, aged turpentine or old samples of petroleum naphtha should not be used since the peroxides usually present in these materials produce deleterious effects. Other oxygen-yielding compounds, for example, oxidized drying oils, should be excluded in order to insure good color, and to avoid degradation and gelation of the resulting compositions.

The more detailed practice of the invention is illustrated in the following examples wherein the amounts of the ingredients are by weight, such examples being given by way of illustration and not as a limitation. In these examples, viscosities and colors are given on the Gardner-Holdt scale, and the hydroxyl numbers are all corrected for acidity. Where the use of cobalt drier is mentioned, sufficient of a 2% cobalt naphthenate solution has been used to give the indicated content of cobalt metal, this proportion being based on oil.

The ester compositions in the title of each example do not mean that the product actually contains the stated percentages of triglycerides, but are instead an index to the proportion of monocarboxylic acid radicals in the product. To illustrate, a product referred to as having 24.4% β-benzoylacrylic acid glyceride and 75.6% linseed acids glyceride is a product prepared from proportions of reactants so chosen as to yield theoretically a mixture of the two mentioned glycerides in the stated proportions by weight, i. e., if it be assumed no mixed ester is formed. Actually, such a product is considered to be composed principally of mixed glycerides, probably mixtures of mixed glycerides, though small amounts of simple glycerides, partial glycerides (i. e., glycerol incompletely esterified), free glycerol, and free acids are probably present. The significance of the acylacrylic acid ester content is discussed following the examples.

EXAMPLE 1

*Glycerol mixed ester of linseed oil acids and β-benzoylacrylic acid*

|   | Percent |
|---|---|
| β-Benzoylacrylic acid glyceride | 24.4 |
| Linseed acids glyceride | 75.6 |

A partial glycerol ester of linseed oil acids, commonly called linseed oil diglyceride, is first prepared by heating 1300 parts of alkali-refined linseed oil and 69.4 parts of refined glycerol for 1.5 hours at 250° C. in an inert atmosphere. To 107 parts of this diglyceride are added 12 parts of toluene and 32 parts of β-benzoylacrylic acid of melting point 94–97° C. (obtainable from benzene and maleic anhydride according to the general method outlined by von Pechmann, Ber. 15, 885 (1882)), and the solution is refluxed for 9.5 hours at 200–210° C. in an apparatus equipped to allow the condensation of toluene and water of esterification, separation of the water, and return of toluene to the reaction vessel. An inert atmosphere of carbon dioxide is maintained throughout this esterification, and at the completion of the reaction a vigorous current of carbon dioxide is blown through the reaction mixture at 200° C. for 20 minutes in order to remove solvent and traces of unreacted acid. After being cooled and filtered, the resulting oil is found to possess the following physical and analytical values: $N_D^{25}$ 1.5100; hydroxyl No. 20.2; acid No. 1.3. With 0.03% cobalt, this oil dries after 8 hours at room temperature over wood and steel to films which are hard, light-colored, and tack-free. On baking, for example at 100° C., drying is much faster, and, if desired, driers can be eliminated. Dried films are hard, glossy and adherent, and are similar in many respects to those obtained from China-wood oil-limed rosin varnishes or from perilla oil-"Amberol" varnishes of about 45-gallon oil length. Unmodified linseed oil under the same drying conditions is tacky and eventually dries to a soft, weak film having residual tack.

Exposures over steel and undercoats after 8 months in Delaware show durability definitely superior to the above varnish controls.

The above product can be made into a varnish as follows: 30 parts of the oil are bodied at 280° C. for 2.25 hours to a thin string. At this point, 7.6 parts of an "Amberol" resin and 0.14 part of lime are added with vigorous stirring. The resulting solution is heated for an additional 0.5 hour at 280° C., cooled to 150° C., and 38 parts of an aromatic hydrocarbon thinner added. After addition of lead naphthenate and manganese resinate driers, the varnish is filtered. The viscosity of the cooled varnish at 50% solids is G-H. Films of this varnish dry tack-free in 4 hours at room temperature and are light in color, clear, and after overnight dry are of a hardness similar to that of films from a perilla varnish of comparable oil length.

This oil can also be made into an enamel as follows: 50 parts of the oil, 25 parts of titanium dioxide, 25 parts of antimony oxide, and 20 parts of a hydrocarbon thinner are ground together to give a dispersed system. Cobalt and lead driers in amounts of 0.03% and 0.3%, respectively, are added. This enamel dries in 10-15 hours at 25° C. to films which are tack-free and hard.

EXAMPLE 2

*Glycerol mixed ester of linseed oil acids and β-(2,4-dimethylbenzoyl)acrylic acid*

| | Percent |
|---|---|
| β-(2,4-dimethylbenzoyl)acrylic acid glyceride | 27.0 |
| Linseed acids glyceride | 73.0 |

To 72 parts of the linseed oil diglyceride described in Example 1 are added 25 parts of β-(2,4-dimethylbenzoyl)acrylic acid of melting point 114° C. (prepared from xylene and maleic anhydride by the general method of Hertzowna and Maechelewski, C. Z. 34, II, 567) and 10 parts of toluene. This mixture is refluxed for 7 hours at 200-210° C. in the same type of apparatus described in the previous example. A vigorous stream of carbon dioxide is next blown through the reaction mixture at 200° C. for 20 minutes in order to remove solvent and unreacted acid. After being cooled and filtered, the resulting oil is found to possess the following physical and analytical values: hydroxyl No. 33.3; acid No. 3.68; viscosity Z-4. Thin films of this oil containing 0.03% cobalt drier are dust-free in less than 3 hours at room temperature, and after 8-10 hours are hard and tack-free. Films of this oil are similar to films of the oil described in Example 1.

EXAMPLE 3

*Glycerol mixed ester of linseed oil acids and β-benzoylacrylic acid*

| | Percent |
|---|---|
| β-Benzoylacrylic acid glyceride | 20.0 |
| Linseed acids glyceride | 80.0 |

To 192 parts of alkali-refined linseed oil are added 45 parts of β-benzoylacrylic acid monohydrate (melting point 61° C.; neutral equivalent 192), 7.1 parts of refined glycerol, and 15 parts of toluene. After heating the mixture for 8.5 hours at 200° C., a homogeneous oil is obtained which, after removal of solvent, is found to possess the following physical and analytical values: $N_D^{25}$ 1.5020; hydroxyl No. 29.15; acid No. 8.47; viscosity V. Thin films of this oil containing 0.03% cobalt drier are dust-free in less than 4 hours and tack-free in about 8-10 hours at room temperature. Films of this oil are similar to films of the oil described in Example 1.

EXAMPLE 4

*Glycerol mixed ester of linseed oil acids and α-acetocrotonic acid*

| | Per cent |
|---|---|
| α-Acetocrotonic acid glyceride | 16.7 |
| Linseed acids glyceride | 83.3 |

To 9.8 parts of refined glycerol is added 30 parts of methyl α-acetocrotonate of boiling point 88-90° C./12 mm. (prepared by condensing acetaldehyde with methyl acetoacetate in the presence of hydrogen chloride catalyst according to the method of Claisen and Matthews, Ann. 218, 172 (1883)). This mixture is then heated in the presence of 0.24 part of litharge catalyst for 28 minutes at 181-195° C. in apparatus similar to that described in Example 1. During this time, 6 parts of methanol are evolved, indicating nearly complete ester interchange between methyl α-acetocrotonate and glycerol. After blowing a vigorous current of carbon dioxide through the reaction mixture for 5 minutes to remove traces of methanol, the product is cooled somewhat and a mixture of 40 parts of linseed oil acids and 118 parts of alkali-refined linseed oil is added. After 12 hours heating at 200-220° C. under conditions described in Example 1, a homogeneous oil having the following physical and analytical values is formed: $N_D^{25}$ 1.4880; hydroxyl No. 13.01; acid No. 6.5; viscosity F; color 6.0. Thin films of this oil containing 0.03% cobalt drier over a steel substrate are hard, light-colored, and tack-free after air-drying for 10-15 hours at about 25° C. Unmodified linseed oil under the same drying conditions is tacky and eventually dries to a soft, weak film.

EXAMPLE 5

*Glycerol mixed ester of linseed oil acids and α-aceto-β-(2-furyl)acrylic acid*

| | Per cent |
|---|---|
| α-Aceto-β-(2-furyl)acrylic acid glyceride | 20.0 |
| Linseed acids glyceride | 80.0 |

To 9.8 parts of refined glycerol are added 41 parts of methyl α-aceto-β-(2-furyl) acrylate of boiling point 156-158° C./2 mm. (prepared by condensing furfural and methyl acetoacetate, using piperidine as catalyst, according to the method of Knoevanagel, Ber. 31, 734 (1898)) and 0.32 part of litharge. This mixture is heated for 25 minutes at 190-200° C. under the conditions of Example 4. To the partial glyceride thus formed are added 46 parts of linseed oil acids and 163 parts of alkali-refined linseed oil, and the resulting mixture is heated for 12 hours at 200-215° C. under the conditions given in Example 1. The resulting homogeneous oil possesses the following physical and analytical values: $N_D^{25}$ 1.4910; hydroxyl No. 18.47; acid No. 7.07; viscosity E. Thin films of this oil containing 0.03% cobalt over a steel substrate dry to exceptionally hard, flexible, adherent, and tack-free films after about 10 hours at room temperature. Such films are strikingly superior to unmodified linseed oil and are also superior in hardness and toughness to films obtained from China-wood oil-limed rosin varnishes or from perilla oil-"Amberol" varnishes of about 45-gallon oil length.

Example 6

*Glycerol mixed ester of linseed oil acids and 2-aceto-5-phenylpentadien-2,4-oic acid*

| | Per cent |
|---|---|
| 2-Aceto-5-phenylpentadien-2,4-oic acid glyceride | 20.0 |
| Linseed acids glyceride | 80.0 |

To 5.3 parts of refined glycerol are added 24 parts of methyl 2-aceto-5-phenyltadien-2,4-oate of boiling point 183–188° C./2 mm. (prepared by condensing cinnamaldehyde and methyl acetoacetate using piperidine catalyst according to the method of Knoevanagel, Ber. 31, 734 (1898)) and 0.20 part of litharge catalyst. This mixture is heated for 0.5 hour at 180–200° C. under conditions described in previous examples. To the partial glyceride thus formed are added 22.7 parts of linseed oil acids and 95.5 parts of alkali-refined linseed oil, and the mixture is heated at 200–218° C. for 12 hours under conditions described previously. The resulting homogeneous oil is found to possess the following physical and analytical values: $N_D^{25}$ 1.4943; hydroxyl No. 15.97; acid No. 8.30; viscosity E; color 9.0. Thin films of this oil containing 0.03% cobalt over a steel substrate are hard, light-colored, and tack-free after air-drying for 10–15 hours at about 25° C. Linseed oil under the same drying conditions is tacky and eventually dries to a soft, weak film having residual tack.

Example 7

*Glycerol mixed ester of linseed oil acids and α-aceto-β-(2-furyl)acrylic acid*

| | Per cent |
|---|---|
| α-Aceto-β-(2-furyl)acrylic acid glyceride | 23.2 |
| Linseed acids glyceride | 76.8 |

To 74 parts of linseed oil diglyceride prepared as described in Example 1 are added 25 parts of ethyl α-aceto-β-(2-furyl)acrylate and 0.1% of litharge based on the linseed oil diglyceride. This mixture is heated in a carbon dioxide atmosphere with rapid stirring in a vessel fitted with a separatory funnel, agitator, gas inlet tube, and efficient fractionating column. Enough toluene is introduced into the reaction vessel so that refluxing occurs at the head of the fractionating column when the bath temperature is 200–240° C. Under these conditions, a toluene-ethanol binary boiling at 70–104° C. distills off. In this way, the theoretical amount of ethanol (5.5 parts) is collected during 7 hours. After removing toluene and traces of ethanol from the residue, a homogeneous oil having the following physical and analytical values is obtained: $N_D^{25}$ 1.495; hydroxyl No. 64.35; acid No. 24.05. Thin films of this oil containing 0.03% cobalt drier over a steel substrate are hard, flexible, adherent, and tack-free after air-drying for 2–3 days at room temperature.

Example 8

*Glycerol mixed ester of linseed oil acids and β-dibenzofuroylacrylic acid*

| | Per cent |
|---|---|
| β-Dibenzofuroylacrylic acid glyceride | 32.0 |
| Linseed acids glyceride | 68.0 |

To 61.6 parts of linseed oil diglyceride described in Example 1 are added 26.6 parts of β-dibenzofuroylacrylic acid and 10 parts of toluene. This mixture is refluxed for 4 hours at 175–183° C., employing 0.1% of sodium bisulfate catalyst based on diglyceride, in the same type of apparatus described in Example 1. A vigorous stream of carbon dioxide is next blown through the reaction mixture at 185° C. for 20 minutes to remove solvent. After being cooled and filtered, the resulting oil is found to possess the following physical and analytical values: hydroxyl No. 11.9; acid No. 4.2; viscosity Z–2. Thin films of this oil containing 0.03% cobalt, after drying for 10–15 hours at room temperature, are very hard, tough, and possess good flexibility.

The β-dibenzofuroylacrylic acid referred to above is prepared by stirring a solution of 49 parts of dibenzofurane and 29 parts of maleic anhydride in 190 parts of carbon disulfide with 80 parts of aluminum chloride for 20–30 minutes. No external heat is applied since the heat of reaction is sufficient to keep the carbon disulfide refluxing. The crude acid separates when the reaction mixture is poured into acidified water. It is purified by dissolving it in dilute aqueous sodium carbonate, filtering, and reprecipitating by addition of acid. After washing in water and drying, the acid melts at 205° C., and has a neutralization equivalent of 269, the calculated value being 266.

For each particular combination of polyhydric alcohol, acylacrylic acid, and other monocarboxylic acid, there is a range of acylacrylic acid-polyhydric alcohol simple ester content within which the products dry fastest and have best film properties generally. In regard to the glycerol mixed esters of acylacrylic acids generally, and more particularly in regard to glycerol mixed esters of β-benzoylacrylic acid and drying or semi-drying oil acids (especially linseed oil acids), it will usually be found that the most valuable products have on the order of 10–40% β-acylacrylic acid glyceride. The proportions for best results will, however, vary somewhat with the particular ingredients.

After the film-forming properties of esters obtained from different proportions of a particular polyhydric alcohol, acylacrylic acid, and other monocarboxylic acid have been established by simple testing, it is possible to prepare, by appropriate selection of proportions, a polyhydric alcohol mixed ester having any desired degree of improvement in film-forming properties (up to the maximum possible for the ingredients involved) as compared to the polyhydric alcohol simple ester of the acid other than the acylacrylic acid. More specifically, when the polyhydric alcohol is glycerol, and the other acid is drying or semi-drying oil acids, it is possible, by appropriate selection of proportions, to prepare a mixed glyceride having the desired degree of improvement (up to the maximum possible for the ingredients involved) as compared to the drying or semi-drying oil whose acids are being used.

The desired proportion of acylacrylic acid glyceride is normally obtained by using the calculated amount of an acylacrylic acid or esterifiable derivative. However, an effect which approaches or equals the behavior of the mixed ester so made can be obtained by preparing a mixed ester of β-acylacrylic glyceride content higher than that desired, and blending it with the drying oil whose acids are being used (or a different oil if desired) in an amount which is calculated to give a mixed ester of the desired acylacrylic acid glyceride content. When the acylacrylic acid glyceride content is high (e. g., above 25%), the blending is preferably carried out at elevated temperature; suitable conditions are, for example, the heating of the two oils, with stirring and in an inert gas atmosphere, for about 0.5 hour at about 200° C. Under these conditions, it is probable that some interchange occurs, since the film-forming properties are usually better than those of cold blends of the two oils.

As has been indicated, the simple esters of this invention can be prepared by reacting the polyhydric alcohol with the acylacrylic acid, or with an appropriate esterifiable derivative thereof, such as the anhydride, acid halide, or esters of an alcohol more volatile than the polyhydric alcohol whose ester is being prepared. The esterification reaction can be controlled so that one or more of the alcoholic hydroxyls are esterified. The reaction temperature can be varied widely. With an acid halide or anhydride, temperatures in the neighborhood of 20-100° C. are sufficient to produce esterification. The direct esterification with acid or the ester interchange process are preferably operated at temperatures above 100° C. and below 275° C.

Also as previously indicated, the mixed esters of the present invention can be made by reacting the polyhydric alcohol, simultaneously or successively, in any order, with the several monocarboxylic acids or their esterifiable derivatives. Or a polyhydric alcohol simple ester of either the acylacrylic acid or other acid can be reacted successively with additional polyhydric alcohol and the remaining acid or acids. In the first, i. e., alcoholysis, step of this latter process, an ester interchange catalyst, such as litharge, sodium hydroxide, sodium alcoholate, etc., is preferably included in small amount, suitably from 0.01% to 1.0%. The reaction temperature for the alcoholysis can be varied from 150° C. to 300° C., depending on the extent of alcoholysis desired, the nature and amount of catalyst present, and the susceptibility of the ester to gelation.

Solvents and other preparative details should be adjusted to the method chosen, the manner of so doing being apparent to one skilled in the art. When the solution method heretofore discussed is to be used, any inert water-immiscible liquid which dissolves the product is suitable, hydrocarbons being preferable, and the amount can be varied as desired. Suitable specific solvents include toluene, xylene, cymene, amyl benzene, tetrachloroethane, anisol, and cyclohexanone. Aromatic hydrocarbons, chlorinated solvents, ethers, and ketones are suitable in general. A boiling point in the range 40-200° C. is desirable. The processes of the invention can also be carried out in the absence of a solvent.

In addition to glycerol, other polyhydric alcohols can be used in the present invention, such as ethylene glycol, diethylene glycol, triethylene glycol, hexamethylene glycol, tetramethylene glycol, erythritol, pentraerythritol, sorbitol, mannitol, cyclohexyl-1,2-dicarbinol, methyltrimethylolmethane, and p,p'-di(2-hydroxyethyl)benzene.

The monofunctional monocarboxylic acid or acids other than the acylacrylic acid can be any monofunctional monocarboxylic acid, or any mixture of such acids. Specific additional acids that are suitable include perilla oil acids, oiticica oil acids, China-wood oil acids, dehydrated castor oil acids, soya bean oil acids, corn oil acids, cottonseed oil acids, coconut oil acids, oleic acid, stearic acid, lauric acid, p-toluic acid, butyric acid, crotonic acid, benzoic acid, furoic acid, sorbic acid, quinolinic acid, α-naphthionic acid, phenoxyacetic acid, and the like. These acids can be aromatic or aliphatic; open or closed chain and, if the latter, monocyclic, polycyclic, homocyclic, or heterocyclic; saturated or unsaturated; straight or branched chain; and substituted or not by other groups or atoms, such as ether, ketone, halogen, etc., which do not interfere with the esterification reaction.

Any monofunctional acylacrylic acid, as the term is hereinbefore explained, or any esterifiable derivative thereof, can be employed. The acyl group can be that of any monocarboxylic acid, and it can be present on either the α or β carbon. The acid may or may not contain substituent radicals of any kind which do not interfere with the resinification reaction. Such radicals can be aliphatic or aromatic; open or closed chain, and, if the latter, homocyclic or heterocyclic; saturated or unsaturated; and substituted or not by inert groups, such as ether, ketone, halogen, and sulfide. The following specific acylacrylic acids can be used in place of the acids of the examples with similar results:

β-(2-naphthoyl) acrylic acid.
β-(4-methoxybenzoyl) acrylic acid.
β-(Benzoyl)-α,β-dimethylacrylic acid.
β-Acetylacrylic acid.
4-ketoheptadien-2,5-oic acid,
α-Acetosorbic acid,
α-Acetoacrylic acid,
α-Benzoylcrotonic acid, and
α-Furoylcinnamic acid.

In addition to the particular coating compositions of the examples, the present esters can be formulated into any other desired type of paint, varnish, lacquer, or enamel. Thus, they can be blended by conventional methods with other varnish gums, such as copal, kauri, ester gum, oil-soluble phenol-formaldehyde resins, and rosin-extended phenol-formaldehyde resins, such as "Amberols"; with other resins, such as vinyl or urea-formaldehyde types; with cellulose derivatives, such as nitrocellulose, cellulose acetate, cellulose aceto-propionate, and ethyl cellulose; with auxiliary components of all kinds, such as waxes, solvents, pigments, and plasticizers, as needed and desired; and to particular advantage with fatty oils, especially drying or semi-drying oils, as is explained above.

These compositions can be applied to many kinds of surfaces and materials, for example, wood, metal, paper, linen, silk, cotton, other textiles, and regenerated cellulose wrapping foils. Specific manufactures that can be so produced are linoleum, patent leather, linoxyn-type materials, coated copper wire, oiled cloth, oiled silk, printing inks, and sandpaper. The products of the invention can also be made up into molding compositions, putties, and the like. In addition, they can be employed as modifying agents for urea-formaldehyde and phenol-formaldehyde resins.

It will be apparent from the foregoing description that new esters having remarkable properties and a wide utility have been obtained. In particular, these esters are valuable substitutes for the natural drying oils in coating compositions, thereby reducing materially the dependence upon these natural products. The new esters have also many advantageous properties not shared by the natural oils, as, for example, the remarkable ability to form films which do not crystallize, wrinkle, or frost, as do films from the more rapidly drying natural oils, such as China-wood oil. Furthermore, it is possible to take any fatty oil, including one that has a low order of drying, and, by substituting a part of the fatty acid making up that oil by an acylacrylic acid, to improve the drying and film properties greatly. The compositions of the present invention are particularly outstanding in that they combine the high film build of the natural drying oils (resulting from the much higher solids content at working viscosities) with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:

1. A polyhydric alcohol ester of an acylacrylic acid.

2. A glycerol ester of an acylacrylic acid.

3. A polyhydric alcohol mixed ester of an acylacrylic acid and another monofunctional monocarboxylic acid.

4. A glycerol mixed ester of an acylacrylic acid and another monofunctional monocarboxylic acid.

5. A glycerol mixed ester of an acylacrylic acid and the acids of a natural fatty oil.

6. A glycerol mixed ester of an acylacrylic acid and the acids of a natural drying oil.

7. A polyhydric alcohol mixed ester the acidic radicals of which comprise those of an acylacrylic acid and of a monofunctional monocarboxylic acid of different structure.

MARTIN E. CUPERY.

---

CERTIFICATE OF CORRECTION.

Patent No. 2,381,886. August 14, 1945.

MARTIN E. CUPERY.

It is hereby certified that error appears in the printed specification of the above numbered patent requiring correction as follows: Page 4, first column, line 11, for "5-phenyltadien" read --5-phenylpentadien--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.

oil by an acylacrylic acid, to improve the drying and film properties greatly. The compositions of the present invention are particularly outstanding in that they combine the high film build of the natural drying oils (resulting from the much higher solids content at working viscosities) with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:

1. A polyhydric alcohol ester of an acylacrylic acid.

2. A glycerol ester of an acylacrylic acid.

3. A polyhydric alcohol mixed ester of an acylacrylic acid and another monofunctional monocarboxylic acid.

4. A glycerol mixed ester of an acylacrylic acid and another monofunctional monocarboxylic acid.

5. A glycerol mixed ester of an acylacrylic acid and the acids of a natural fatty oil.

6. A glycerol mixed ester of an acylacrylic acid and the acids of a natural drying oil.

7. A polyhydric alcohol mixed ester the acidic radicals of which comprise those of an acylacrylic acid and of a monofunctional monocarboxylic acid of different structure.

MARTIN E. CUPERY.

CERTIFICATE OF CORRECTION.

Patent No. 2,381,886. August 14, 1945.

MARTIN E. CUPERY.

It is hereby certified that error appears in the printed specification of the above numbered patent requiring correction as follows: Page 4, first column, line 11, for "5-phenyltadien" read --5-phenylpentadien--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.